ABSTRACT OF THE DISCLOSURE

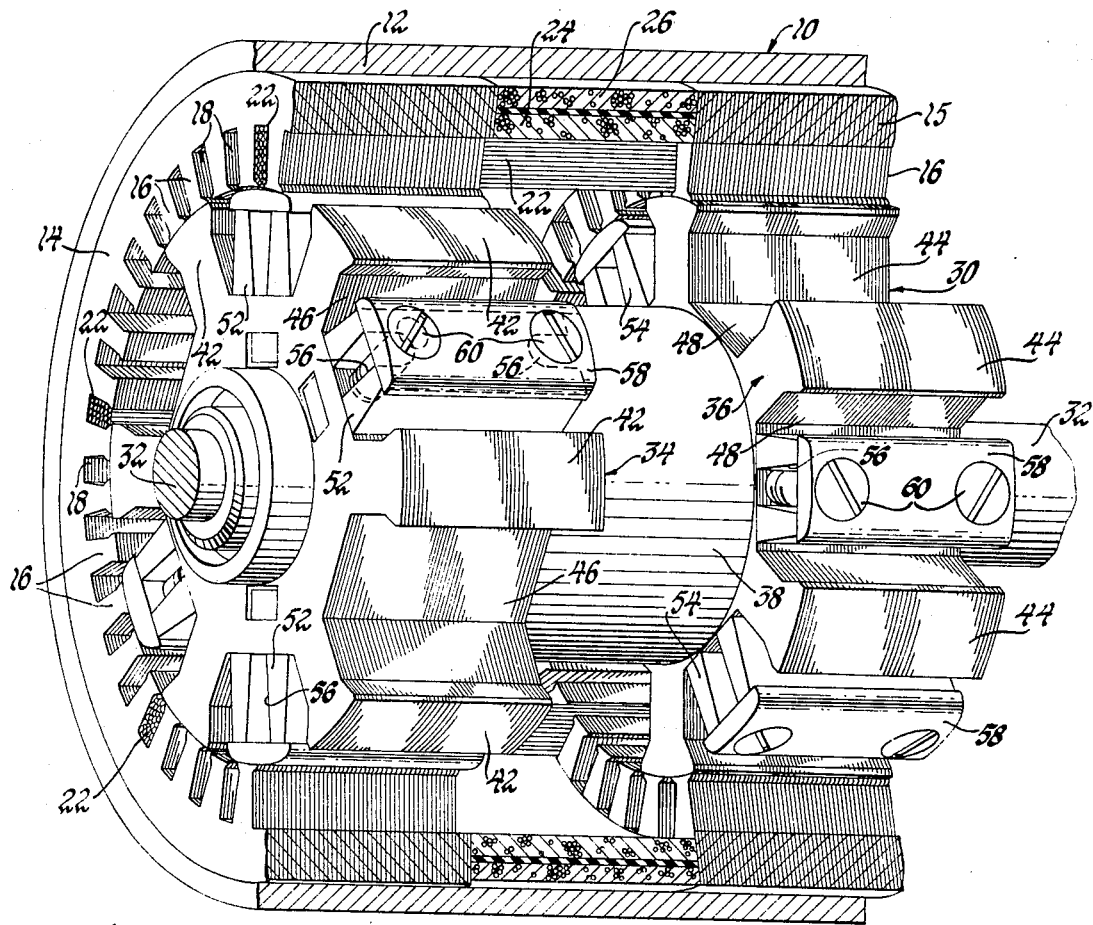
Fig. 1
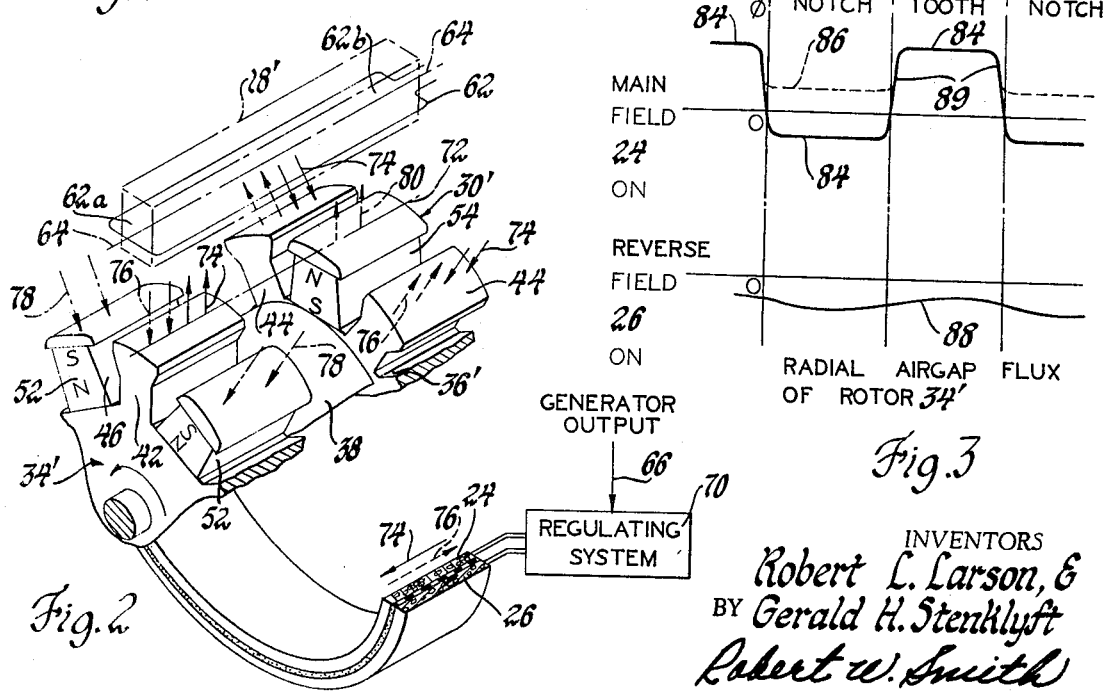
Fig. 2
Fig. 3
INVENTORS
Robert L. Larson, &
BY Gerald H. Stenklyft
Robert W. Smith
ATTORNEY 3,512,076
TRANSISTOR VOLTAGE REGULATING SYSTEM FOR GENERATORS HAVING MAIN AND REVERSE FIELD WINDINGS
Robert L. Larson and Gerald H. Stenklyft, Anderson, Ind., assignors to General Motors Corporation, Detroit, Mich., a corporation of Delaware
Filed Sept. 11, 1968, Ser. No. 759,169
Int. Cl. H02p 9/30
U.S. Cl. 322—28                                   3 Claims

In a preferred embodiment, a voltage regulating system is provided for a generator having an output winding, a permanent magnet field provided by one or more permanent magnets and main and reverse field windings which are connected in series across the generator output. The regulating system is capable of maintaining the output voltage of the generator substantially constant and includes a regulating output transistor connected in series with the main field winding and in parallel with the reverse field winding. A voltage sensing circuit senses the output voltage of the generator and biases the output transistor alternatively conductive and nonconductive as a function of the generator output voltage. When the output transistor is biased conductive it shorts out the reverse field winding and energizes the main field winding. The main and reverse field windings are energized in series when the output transistor is biased nonconductive but the excitation of the main field winding is negligible since the reverse field winding includes a larger resistance and more coil turns. Only the reverse field winding of the generator develops maximum field strength which is produced to oppose the effect of the magnetic field provided by the permanent magnets.

---

This invention relates to voltage regulators for generators and more particularly to a voltage regulating system which is capable of regulating the output voltage of a generator which has a permanent magnet field and main and reverse field windings.

The output voltage of a generator which has a field winding can be controlled by regulating the amount of field current supplied to the field winding as is well known to those skilled in the art. The present invention is concerned with a voltage regulator for a generator that includes a permanent magnet field which aids the generator main field to increase the maximum available generator output current. One generator of this type is disclosed in copending United States patent application of Robert W. Campbell, Ser. No. 381,127, now Pat. No. 3,392,294, filed on July 8, 1964, and assigned to the assignee of this invention.

The generator of the above-mentioned copending application can be regulated to some extent by controlling the amount of current supplied to a main field winding. It is apparent, however, that even if the excitation current for the main field winding is reduced to substantially zero the magnetic field produced by the residual induction of the permanent magnets will still cause a voltage to be generated in the output winding of the generator. It has been found that this permanent magnet field is sufficient to cause a voltage to be generated that is higher than the desired regulated value when the generator is driven at high speed and at the same time is operating under a light electrical load.

The magnetic field provided by the permanent magnets of the generator can be opposed by providing a reverse field winding for the generator. The magnetic flux of the reverse field winding opposes the effect of flux developed by the permanent magnets to therefore maintain a desired generator output voltage. When the generator is utilized in a vehicle electrical system, including a battery charging circuit, voltage regulation is especially important to avoid shortened battery life that might otherwise be caused by either low or excessive charging voltages.

Although the regulating system of this invention is designed specifically to regulate the output voltage of a generator which includes permanent magnets it can also have utility in generating systems where residual induction is developed by the residual magnetism of the magnetic circuit of the generator. An excessive voltage can be generated in this type of system and the flux developed by a reverse field winding can be utilized to oppose the residual magnetic field. It will, of course, be appreciated by those skilled in thes art that generators with magnetic circuits having high retentivity provide some degree of residual magnetism, and this type of magnetic circuit is utilized to provide a generator which will initially build up voltage without some initial excitation of the field winding of the generator.

In the present invention a regulating system for generators having main and reverse field windings is provided which is capable of precisely regulating the generator output voltage while operating with varying loads and speeds. The main field flux is turned off and the reverse field winding is energized to oppose the effect of the permanent magnet flux when the output voltage of the generator exceeds a desired regulated value.

Accordingly, it is an object of this invention to provide a generator voltage regulating system including a field winding control circuit that is operative to control the amount of current supplied to the reverse field as a function of the output voltage of the generator.

A further object of this invention is to provide a variable speed alternating current generator having main and reverse field windings connected in series with a voltage regulating system having a single voltage responsive switching device that is connected in parallel with one of the windings to provide main field winding excitation when the generator output voltage drops below a desired regulated value and reverse field winding excitation when the voltage increases above the desired regulated value.

A still further object of this invention is to provide a generator voltage regulating system for a generator having a main field winding, a reverse field winding and a magnetized core portion producing a flux due to the residual induction of permanent magnets or residual magnetism. The regulating system includes a series connection of the main and reverse field windings across the generator output with a regulating output transistor connected across the reverse field winding and in series with the main field winding. The reverse field winding excitation is provided when it is operatively conected in series with the main field winding by the output transistor being biased nonconductive. The reverse field flux neutralizes the effect of the magnetized portion which tends to increase the generator output voltage after the main field current has been substantially reduced.

A still further object of this invention is to provide a generator voltage regulating system for a variable speed alternating current generator adapted for use in land or marine vehicles requiring heavy duty electrical systems in which the generator includes a main field winding, one or more permanent magnets for increasing the generator output capacity above that produced by the main field alone, and a reverse field winding for producing a magnetic field to oppose the permanent magnet flux tending to increase the generator output above a desired voltage when the main field flux is off. The generator reverse field winding has a higher resistance and more coil turns than the main field winding and is connected in parallel with a regulating output transistor also conecting the main field winding in series across the generator output voltage so that the field windings are alternately excited to produce opposite flux fields that increase and decrease the generator output voltage when the output transistor is biased respectively conductive and nonconductive.

Further objects and advantages of the present invention will be apparent from the following description, reference being had to the accompanying drawings wherein a preferred embodiment of the present invention is clearly shown.

In the drawings:

FIG. 1 is a perspective view, partially in section, of a generator having main and reverse field windings and permanent magnets which is regulated by the voltage regulating system of this invention.

FIG. 2 is a fragmentary perspective view illustrating the operation of the generator shown in FIG. 1.

FIG. 3 illustrates graphs of flux distribution across the air gap of the generator shown in FIG. 2.

Figure 4:
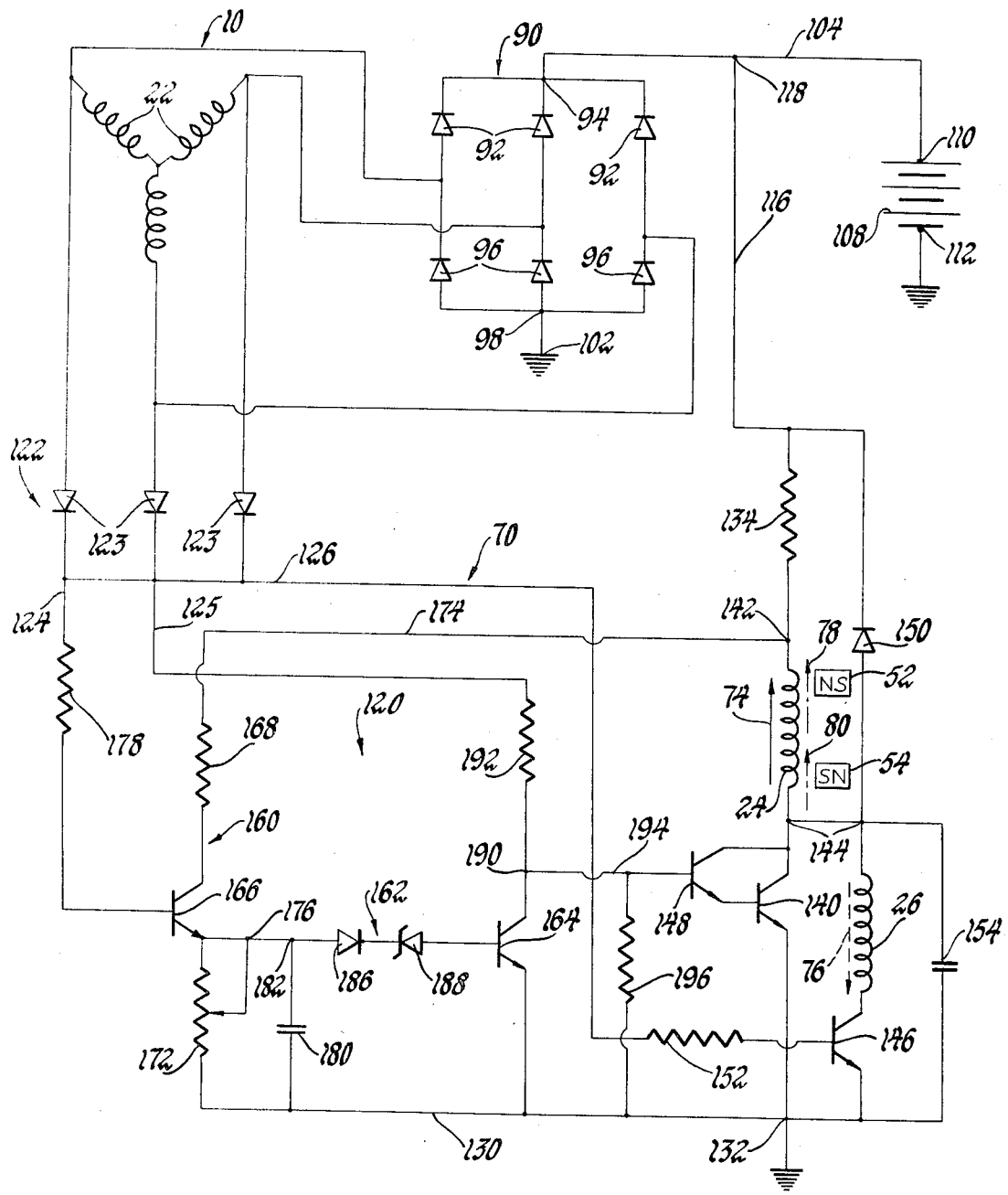
FIG. 4 is a schematic circuit diagram of a generator voltage regulating system made in accordance with the present invention.

Referring now to FIG. 1 wherein reference numeral 10 generally designates an alternating current generator which is regulated by the voltage regulator of this invention. The generator 10 is of the brushless homopolar inductor type described and claimed in the aforementioned application Ser. No. 381,127, filed July 8, 1964.

The generator provides a rugged and compact machine intended for use, in one working embodiment, as the generator power source for electrical systems of large land vehicles or boats having inboard engines. An increased generator power output is provided by incorporating a permanent magnet field in aiding relationship to the flux distribution produced by a main field flux. Since the permanent magnetic field is continuous, an opposing flux field is required to cancel the voltage producing effect of the permanent magnetic flux so that the generator output can be regulated as described more fully hereinbelow. Alternating current generator 10 is described by way of example and not limitation as one type of generator intended to be controlled by the control arrangement of this invention.

The alternating current generator 10 includes a frame portion 12 supporting a stator core formed by two aligned stacks of laminations 14 and 15. The stator laminations are made of a magnetic material and each include stator tooth portions 16 which form stator slots indicated by numeral 18. The slots 18 of each stator stack receive conductors of a generator output winding designated 22. The winding 22 is only partially illustrated in some of the slots 18 as an example of the coil conductors of winding 22 which are wound in a three phase Y connected configuration in a conventional manner.

The space between the stacks of stator laminations 14 and 15 contains a main field winding designated 24 and a reverse field winding designated 26. The generator windings 22, 24 and 26 terminate in connections, not shown, suitable for conection to a circuit including the control arrangement of this invention described herein below.

The generator has a rotor generally indicated by numeral 30 which is mounted within the stator core laminations and includes a rotor shaft 32 that is rotatably supported by bearing members, not shown. The rotor 30 is adapted to be driven by a vehicle internal combustion engine, also not shown. A first stack of rotor laminations designated 34 and shown at the left end of rotor 30 and a second stack of rotor laminations designated 36 and shown at the right end of rotor 30 are both made of magnetic material and are securely mounted on shaft 32. Rotor stacks 34 and 36 are separated by a rotor core portion 38 which is formed of magnetic material. The core portion 38 forms a magnetic circuit path between the rotor stacks 34 and 36.

Each of the rotor stacks comprises six tooth portions respectively designated 42 and 44. The space between adjacent rotor teeth of each rotor stack forms notches designated 46 and 48, respectively, on each rotor stack. The axis of each tooth of one rotor stack is aligned with the center of a notch of the other rotor stack. Selected notches receive permanent magnets designated 52 and 54, respectively, carried by the rotor stacks 34 and 36. Accordingly, the axes of permanent magnets 52 and 54 are respectively aligned with the tooth axes of the teeth 44 and 42.

The four permanent magnets designated 52, illustrated on the first rotor stack 34, have a common radial polarity. Also, the four permanent magnets designated 54 on the second rotor stack 36 have a common and mutually opposite radial polarity to that of permanent magnets 52 of the first rotor stack. For example, the outer tip of each permanent magnet 52 is a south pole while the outer tip of each permanent magnet 54 is a north pole.

Each of the permanent magnets 52 and 54 is formed by a bar of permanently magnetized material having end grooves indicated by numeral 56. Each permanent magnet is attached to a rotor stack by means of a cap 58 and screws 60 fastened to the rotor stack. With cap 58 and screws 60 in place, each permanent magnet is accordingly clamped between a cap 58 and the bottom of the respective rotor notches 46 and 48.

Although two opposite notches of each stack are shown vacant, all the notches can be provided with permanent magnets to further increase the output in accordance with the operation of this generator. The four vacant notches illustrated in the embodiment of FIG. 1 provide increased air circulation to improve generator cooling.

The output of the generator shown in FIG. 1 was compared with the output of a similar generator having permanent magnets 52 and 54 removed. The maximum output current capability was increased an average of thirty percent above the output produced without the magnets throughout the operating speed range of the generator. However, at some low load conditions and with the main field deenergized the permanent magnets continued increasing the generator power output so that an opposing or reverse field flux is required to provide a desired regulated voltage output.

The operation of the generator 10 illustrated in FIG. 1 is described with reference to FIGS. 2 and 3. FIG. 2 shows a fragmentary view of a rotor 30' having stacks designated 34' and 36', main and reverse field windings 24 and 26 and a single turn coil designated 62 which represents a coil of the output winding 22. The coil 62 is shown in an exploded position having a coil axis 64. The coil is illustrated wound about a single elongated stator tooth 18', although in the generator of FIG. 1 a coil encompasses three teeth so that the width of the coil sides is equal to the distance between the centers of a notch and a rotor tooth.

The voltage induced in coil 62 produces the generator output indicated at 66 in FIG. 2 which is applied to the voltage regulating system 70 of the present invention. The regulating system 70 controls the excitation of the main field winding 24 and the reverse field winding 26 in response to the generator output 66 as described further hereinbelow.

To explain the effect of the permanent magnets, the first rotor stack 34' is illustrated with two permanent magnets 52 having the indicated radial polarity retained in the notches 46 adjacent rotor tooth 42. Stack 34' rotates beneath the forward end 62a of coil 62. The second rotor stack 36' is illustrated with the permanent magnet 54 retained in the notch between the two rotor teeth 44.

Accordingly, the stack 36' rotates beneath the rear portion 62b of coil 62. The magnet 54 is aligned along the common axis 72 with tooth 42 and has the indicated radial polarity opposite that of magnets 52. The description of operation of FIG. 2 correspondingly applies to the generator of FIG. 1 by considering a permanent magnet placed in all rotor notches so that twelve rather than eight permanent magnets would be required. As noted above, increasing the number of magnets will correspondingly increase the generator output.

The main field winding 24 produces a flux represented by arrows 74 and the reverse field winding 26 produces a flux represented by arrows 76 in an opposite direction. The magnetic fluxes 74 and 76 flow radially through the teeth of each rotor stack such that each flux is opposite to the other but each has a constant direction through each tooth of a given rotor stack. This type of generator is characterized as being a homopolar flux machine because flux is produced in a common direction relative to the ends of the generator.

The radial magnetic flux across the air gap between the rotor and stator is referred to as the air gap flux which is represented by the arrows at the tips of the rotor teeth and permanent magnets. The arrows 74 and 76 indicate the direction of the fluxes resulting from the corresponding main and reverse magnetic fields producing them. Accordingly, the flux of teeth 42 and 44 produced by the main field flux 74 is outward at tooth 42, inward at tooth 44 and vice versa for reverse field flux 76.

The air gap fluxes produced by permanent magnets 52 and 54 are indicated respectively by arrows 78 and 80. The flux 78 of permanent magnets 52 is radially inward and the direction of air gap flux 80 produced by permanent magnet 54 is radially outward.

FIG. 3 illustrates the distribution of radial air gap flux $\phi$ around the periphery of the illustrated fragmentary portion of the first rotor stack 34' which is produced by the fluxes 74, 76 and 78 shown in FIG. 2. The line 84 of the upper graph indicates the difference in flux distribution between a rotor tooth 42 and a notch containing a permanent magnet 52 with the main field winding 24 producing flux 74. It is assumed in this graph that the reverse field flux 76 is not produced since the reverse field winding 26 is deenergized. The direction of flux across a notch having a permanent magnet 52 is opposite to the direction of flux of an adjacent tooth 42 as indicated by directional arrows 74 and 78.

The dashed line portion 86 of FIG. 3 indicates the flux distribution that is provided through a notch portion without a permanent magnet. The line 84 across a notch illustrates that there is a greater change in flux compared to that across a tooth with the use of permanent magnets. Although the flux produced by the permanent magnets of each rotor stack is in an opposite radial direction from the flux produced by the main field winding 24, the effect of the permanent magnet fluxes is to increase the electromotive force generated in coil 62 as explained below.

It is understood that the radial air gap flux distribution of the second rotor stack 36' would be the same as illustrated in FIG. 3 except that the polarity would be reversed. This is apparent by noting the direction of the arrows representing corresponding fluxes at the tips of the two rotor stacks illustrated in FIG. 2.

The bottom graph of FIG. 3 includes the line 88 illustrating the radial air gap flux of rotor 34' with the reverse field winding 26 energized and the main field flux 74 off. The flux 76 produces a substantially constant peripheral flux distribution. Flux 76 is produced to substantially neutralize the effect of any change in radial flux due to the continuous flux produced by the residual induction of permanent magnets 52 and 54.

Without permanent magnets 52 and 54, the generator illustrated in FIG. 2 operates as a conventional homopolar generator. As is known, in the general operation of a homopolar inductor generator there is a periodic change in the magnitude of flux interlinking the output winding. The change in magnitude of the unidirectional flux at each end of the generator is produced by a rotor having alternate tooth and notch portions wherein the notches provide a high reluctance to vary the reluctance to the main field flux. Without the permanent magnets there would be a maximum of flux at the center of each tooth and a minimum flux at the center of each notch as indicated by the line 86 in the upper graph of FIG. 3.

The variable flux is rotated past a coil winding, such as coil 62, when rotor 30' rotates to thereby produce a generated voltage or electromotive force in the generator output coils. Voltage is generated in accordance with the rate of change of magnetic flux interlinking each output coil winding. The mathematical term $d\phi/dt$ is commonly used to express the rate of change of magnetic flux. Since the electromotive force induced in the coil depends on the change in flux, it can be seen that the permanent magnets increase the rate of change in flux or $d\phi/dt$ because of increased difference in flux intensity so that the permanent magnet fields are in an aiding relationship to the main field flux.

This can be understood by observing the rotation of the rotor of FIG. 2 in a counterclockwise direction and considering initially that the axis 72 of tooth 42 and permanent magnet 54 is approaching but not aligned with the axis of coil 62. In this condition forward end 62a of coil 62 will be interlinked along its left-hand portion with the inward flux 78 of the left permanent magnet 52 and the outward main field flux 74 is interlinked with the right-hand portion. The right and left sides of the coil end 62a have an induced voltage produced therein in a clockwise direction around the coil 62. The opposite coil end 62b is interlinked on its right-hand side with the outward flux 80 of magnet 54 and on the left-hand side with the inward flux 74 of the left rotor tooth 44. The right- and left-hand conductors of end 62b have a voltage induced therein which is also in a clockwise direction around the coil 62 to aid the induced voltage of the end 62a.

As the axis 72 of tooth 42 and permanent magnet 54 reaches and is aligned with the axis 64 of coil 62 there is a maximum and substantially constant flux density interlinking the coil and at this instant there will be minimum voltage induced in coil 62.

As the rotor 30' continuous to rotate, the axis 72 of tooth 42 and permanent magnet 54 moves beyond or to the left coil axis 64. In this relationship the voltage begins to be induced in a counterclockwise or opposite direction of that induced when axis 72 was to the right of the coil axis. This is because the flux 78 of the right permanent magnet 52 is now interlinked with the right-hand portion of coil end 62a and the outward flux 74 of tooth 42 is interlinked with the left-hand portion of coil 62. In like manner, the coil end 62b is interlinked on its right side with inward flux 74 of the right-hand tooth 42 and on the left coil side with outward flux 80.

The induced counterlockwise voltage tends to increase and reach a maximum as the rate of change of flux between a tooth and a permanent magnet reaches a maximum. This condition corresponds to the region of the line 84 in FIG. 3 indicated at 89. As the axis 72 rotates further, the axis of right permanent magnet 52 and opposite rotor tooth 44 approaches the axis of coil 62 and the induced voltage produced in a counterclockwise direction decreases. The above-described cycle is repeated through the several stator coils by the rotation of the rotor in producing an alternating current voltage in the generator output winding 22.

When the generator regulated voltage output is reached, the regulating system 70 deenergizes the main field winding 24 so that flux 74 is no longer produced. The magnetic fields of permanent magnets 52 and 54 continue to produce the respective fluxes 78 and 80 tending to generate an induced voltage in coil 62 if the reverse field 26 is not energized. The permanent magnet flux has a maximum intensity at the tip of each permanent manget and a minimum intensity between adjacent magnets.

At high speeds and low generator electrical loads the effect of the change in flux is increased so that the output voltage of the generator may continue above the desired regulated value. With the reverse field winding 26 energized, the reverse field flux 76 tends to substantially neutralize the change in radial flux distribution along the periphery of a rotor stack that is produced by the permanent magnet fields alone. This is seen by observing the graph of line 88 in FIG. 3. With a substantially constant flux interlinking the coil 62 the induced voltage drops and the generator output is reduced to the regulated value.

The reverse field winding flux 76 produces an inward flux at teeth 42 and outward flux at teeth 44, which is opposingly interlinked with the coil ends 62a and 62b with respect to the permanent magnet fluxes. The coil end 62a is interlinked with a substantially constant inwardly directed flux and end 62b is interlinked with a substantially constant outward flux. Since both ends of the coil are interlinked with substantially unvarying and opposingly directed fluxes, there will be a negligible net voltage generated in the coil 62.

It is to be kept in mind that when the coils of generator output winding 22, as represented by the single coil 62 in FIG. 2, are supplying a load, the basic operation described above is cyclically repeated at ta high rate. The main and reverse field windings 24 and 26 are alternately excited so that the desired generator voltage output is maintained by the regulating system 70 of this invention.

Referring now to FIG. 4, a schematic circuit diagram is shown that illustrates the generator regulating system of the present invention. The generator 10 is of the type described hereinabove and is illustrated with corresponding elements designated with like numerals to those used in FIGS. 1 and 2. The three-phase output winding 22 and main and reverse field windings 24 and 26, respectively, are illustrated connected to the voltage regulating system 70.

The direction of flux of main field winding 24 is indicated by the arrow 74 and the oppositely directed flux of reverse field winding 26 is represented by the arrow 76. The rotor permanent magnets 52 and 54, described hereinabove, are illustrated with their respective fluxes represented by arrows 78 and 80. Both arrows 78 and 80 are in the same direction as arrow 74 representing the main field winding flux. The common direction represents the operatively aiding relationship of the permanent magnet fields in increasing the generator voltage output as described also hereinabove.

In one embodiment of the generator voltage regulating system of this invention, the main and reverse field magnetic fluxes are produced by a main field winding 24 consisting of 156 winding turns of a number sixteen gauge wire conductor having approximately one ohm resistance and a reverse field winding 26 consisting of 390 winding turns of a number twenty-six gauge wire conductor having a resistance of approximately fifteen ohms. The difference of resistance and coil turns enables the two field windings to be connected in a series circuit across the generator output and selectively excited by the regulating system of this invention.

The output of the three-phase output winding 22 is rectified by a power rectifier circuit generally designated by the reference numeral 90. The power rectifier circuit 90 includes six silicon diodes connected in a conventional three-phase full-wave rectifier bridge arrangement with the upper three diodes 92 providing positive voltage at junction 94. Junction 94 forms the generator positive direct current power output terminal. The lower three diodes 96 are connected to a common junction 98 providing the negative output terminal which is connected to ground indicated at 102. The rectifier circuit 90 is located in a housing attached to the frame of generator 10.

A cable conductor 104 is connected to the positive output terminal 94 to supply a load circuit connected to the generator which is supplied at one desired regulated direct current voltage of, for example, 14 volts. The generator load circuits which are connected to the cable 104 include various direct current loads including a storage battery 108 having a positive terminal 110 and grounded negative terminal 112. The grounded terminals 102 and 112 are connected to a conductive frame portion of a vehicle. The additional direct current loads are connected, as is the battery 108, between cable conductor 104 and a common ground.

The transistor voltage regulating system 70 of this invention is connected to the generator output by a conductor 116 which is connected to conductor 104 at junction 118. The conductor 116 applies a positive generator load output voltage to one end of a voltage sensing circuit 120 and also a series circuit including main field winding 24 and reverse field winding 26. Regulating system 70 is also connected to an auxiliary rectifier or diode trio circuit designated by the reference numeral 122 including three silicon diodes each designated 123. Each diode 123 is connected to a separate terminal of output winding 22 in the same manner as are diodes 92 of the power rectifier circuit 90. The auxiliary rectifier circuit provides a system turn-off or disconnect feature to prevent current drain from the battery 108.

The auxiliary rectifier circuit 122 is connected to the terminals of three phase generator output winding 22 to form an auxiliary bridge arrangement that includes the lower diodes 96 of the power rectifier circuit 90. The auxiliary bridge circuit 122 provides a positive voltage on conductors 124, 125 and 126 relative to the system ground potential. A current path can be traced from one terminal of output winding 22, through the auxiliary rectifier circuit 122, through either of the conductors 124, 125 or 126 to a grounded conductor 130 that is grounded at junction 132. The path is completed through grounded terminal 98 of the power rectifier circuit 90 and a second terminal of winding 22.

The series circuit including the main field winding 24 and the reverse field winding 26 is supplied current by the voltage of positive power terminal 94 through a circuit including conductor 116, a resistor 134, a regulating output transistor comprising NPN transistor 140, and grounded conductor 130. Resistor 134 is connected between conductor 116 and the upper end of winding 24 at junction 142. The collector electrode of transistor 140 is connected to both the lower end of main field winding 24 and the upper end of reverse field winding 26 at one of the common junctions 144. The emitter electrode of transistor 140 is connected to grounded conductor 130. The lower end of reverse field winding 26 is connected in series with grounded conductor 130 through the collector and emitter electrodes of a first turn-off transistor 146 comprising an NPN type transistor. The collector-emitter circuit of transistor 140 is accordingly connected in series with main field winding 24 and in parallel with the series connection of reverse field winding 26 and transistor 146.

The transistor 140 operates as a voltage responsive switching device and is interconnected to an NPN transistor designated 148 in a conventional Darlington amplifier arrangement. The collector electrodes are coupled together at junction 144 and the emitter electrode of transistor 148 is directly coupled to the base electrode of transistor 140. The Darlington amplifier provides improved switching operation including an increased amplification factor due to the compound effect of the two transistors. Operative biasing at the base electrode of transistor 148 also biases the base input circuit transistor 140, as is well known, so that the two transistors are concurrently biased conductive and nonconductive.

A field discharge diode 150 is connected across the main field winding 24 and resistor 134 to suppress inductive voltage surges. The diode 150, also referred to as a free-wheeling diode, provides a circuit path to dissipate the inductive energy developed by a sudden decrease of current through winding 24 when the transistor 140 is biased nonconductive. Transistor 146 being connected in series with reverse field winding 26 prevents current drain from battery 108 through field windings 24 and 26 to ground when the system is turned off. A current limiting resistor 152 is connected between the base electrode of transistor 146 and conductor 126. The collector-emitter circuit of transistor 146 is biased conductive when the base input circuit is forward biased by the positive voltage occurring on conductor 126 and is maintained conductive as long as the generator is producing an output voltage. With the transistor 146 conductive, the reverse field winding 26 is operatively connected in parallel with the collector-emitter circuit of transistor 140 and in series with main field winding 24.

A protective capacitor 154 is connected across the reverse field winding 26 and transistor 146. The capacitor 154 absorbs self-induced energy tending to produce a voltage surge when the current flow is suddenly switched away from reverse field winding 26 to the collector-emitter circuit of transistor 140 when it is biased conductive. The capacitor 154 can be replaced by a diode similar to diode 150 although dissipation of the self-induced energy of winding 26 is aided by the low impedance collector-emitter circuit of transistor 140 as it is biased conductive.

The voltage sensing circuit of the regulator, designated generally by the numeral 120, controls the switching operation of transistor 140 and is now described. The voltage sensing circuit 120 includes a voltage divider network 160, a voltage reference means 162 and a driver transistor designated 164.

The voltage divider network 160 includes a second turn-off transistor comprising NPN transistor 166 having a collector electrode connected to one end of a fixed resistor 168 and its emitter electrode connected to variable resistor 172. The other end of resistor 168 provides one end of the voltage divider and is connected through conductor 174 to the junction 142. The other end of the variable resistor 172 forms the other end of the voltage divider and is connected to the grounded conductor 130 so that the voltage divider network 160 is connected across the generator output. The slider tap of variable resistor 172 provides the voltage divider output between junction 176 and ground which is a function of the output voltage of the generator.

The base electrode of transistor 166 is connected through a base current limiting resistor 178 to the conductor 124. Transistor 166 is biased conductive by the positive voltage of conductor 124 and is biased nonconductive when the generator system is off and no generator voltage is being produced. The transistor 166 blocks discharge current from battery 108 through the voltage divider 160 to ground when the system is off.

Resistor 134, noted hereinabove, is also referred to as a "pickup" resistor since it causes the generator output to be raised to compensate for the voltage drop due to the resistance of cable 104. Junction 118 is physically close to the generator output terminal 94 when the regulating system is mounted within or near the frame of generator 10. In some vehicles, the battery 108 is mounted at a sufficient distance from the generator so that the voltage provided at battery 108 is somewhat lower than that sensed by the regulator system. The voltage regulating system maintains the generator output voltage substantially constant but changes in generator loads cause variation of load current. There is, accordingly, some variation in the voltage drop through the conductor 104. To maintain the state of charge of the battery 108 constant, resistor 134 is provided to maintain a substantially constant charging voltage at terminal 110. Battery charging voltage is somewhat critical since improper charging can damage the battery or shorten its useful lifetime.

The resistor 134 is connected to the junction 142 which is connected both to one end of the voltage divider 160 and to the main field winding 24. At a fixed generator speed the required main field winding current correspondingly varies with change in the generator loads. The current through resistor 134 then varies as the load current varies through conductor 104. When the current, and therefore the voltage drop, of the conductor 104 increases, the main field excitation current increases to increase the voltage drop across resistor 134. This increased voltage drop of resistor 134 is effectively subtracted from the voltage being sensed by voltage divider 160 to increase the generator output voltage. Conversely, a drop of load current correspondingly decreases the required field current so that the output voltage of the generator will be lowered because there is less voltage drop across resistor 134. If the compensation for cable voltage drop is not required it is understood that the resistor 134 can be omitted.

Referring now further to the voltage sensing circuit 120, the output of voltage divider 160 is provided at the junction 176 which is connected to the slider tap of the variable resistor 172. Junction 176 is also connected to one end of a filter capacitor 180 at junction 182 and the opposite end of the capacitor is connected to conductor 130. Junction 182 is also connected to the voltage reference means 162 including a silicon diode 186 and Zener diode 188. The anode of diode 186 is connected to junctions 176 and 182 and the cathode is connected to the cathode of the Zener diode 188 having a predetermined reverse breakdown voltage. The Zener reverse breakdown voltage characteristic varies with changes in ambient temperature and to compensate for this variation the voltage characteristic of diode 186 is selected to vary inversely. Accordingly, a substantially constant breakdown voltage response is provided by the diode 186 and Zener diode 188.

The reverse breakdown voltage of Zener diode 188 is selected so that it conducts reverse current when the voltage divider output potential at junction 176 has a predetermined value. The position of the slider tap of variable resistor 172 is accordingly selected to provide this breakdown voltage in accordance with the desired generator output voltage applied across voltage divider 160. As the slider tap is adjusted downward to decrease the resistance of variable resistor 172, a larger output voltage will be required to reach the breakdown voltage. This will increase the desired regulated generator output voltage. If the slider tap is moved upward to increase the resistance of resistor 172, a lower generator output voltage will produce the breakdown voltage.

The base electrode of transistor 164 is connected to the anode of Zener diode 188. The transistor 164 is referred to as a driver transistor since it controls the conduction of the Darlington amplifier transistors 148 and 140. The collector electrode of transistor 164 is connected to junction 190 and through a resistor 192 to the conductor 125 and the emitter electrode is connected to the grounded conductor 130. Transistor 164 is biased conductive when Zener diode 188 of the voltage reference means 162 reaches its breakdown voltage and the potential at the base of transistor 164 rises. The positive voltage at junction 176 of the voltage divider circuit provides the forward base biasing voltage so that transistor 164 is biased conductive.

The collector electrode of transistor 164 is also connected to the base electrode of transistor 148 by conductor 194 connected to junction 190. A bias resistor 196 is connected between the conductor 194 and grounded conductor 130 to provide suitable input biasing resistance for transistor 148 and the Darlington amplifier circuit also including transistor 140. The voltage at conductor 194 varies as a function of the conduction or nonconduction of transistor 164.

The voltage occurring at junction 190 and the collector electrode of transistor 164 is supplied by the voltage of conductor 125 which accordingly raises the voltage to a positive value when transistor 164 is nonconductive. The positive voltage applied to the base of transistor 148 forward biases the base-emitter circuits of transistors 148 and 140. Base drive current flows through both base-emitter circuits in accordance with the operation of a Darlington amplifier circuit so that both transistors 148 and 140 are biased conductive.

When the transistor 164 is biased conductive, the voltage on conductor 194 drops to a low value corresponding to the ground potential of conductor 130 so that the base electrode of transistor 148 is placed close to ground potential. Accordingly the transistor 140 is biased nonconductive, the lower end of main field winding 24 and junction 144 are isolated from ground by the high impedance of the collector-emitter circuit of transistor 140.

The operation of the generator voltage regulating system will now be described by reference to FIG. 4. Before the system is energized by driving the generator rotor, the battery current is blocked by the diodes 92 of the rectifier circuit 90 and the nonconductive transistors of the voltage regulating system 70. Current drain from the battery terminal 110 is accordingly prevented since no low impedance path exists to a grounded terminal. The generator will begin to develop a voltage in output winding 22 due to the permanent magneic field when the rotor is driven by a vehicle engine. During generator operation, the output voltage is dependent upon the rotor speed, the amount of current supplied to the main field winding 24, and the flux produced by the permanent magnets 52 and 54 as described above.

The three phase voltage of output winding 22 is rectified by the power rectifier circuit 90 and auxiliary rectifier circuit 122. Positive direct current voltage appears between cable conductor 104 and ground and also between conductors 124, 125 and 126 and ground. Transistors 166 and 146 are biased conductive by the respective positive voltages of conductors 124 and 126 which are applied respectively through resistors 178 and 152. Accordingly, the voltage divider network 160 is connected across the generator output terminal of rectifier circuit 90 at junction 118. The reverse field winding energizing circuit is made operative since the transistor 146 is biased conductive. Also, the positive voltage of conductor 125 provides the forward biasing potential on conductor 194 to bias both transistors 148 and 140 conductive.

The voltage of conductor 104 is applied across the main field winding 24 and current begins to flow through the resistor 134, the main field winding and transistor 140 as the generator output voltage begins to build up. The generator output provides the excitation of main field winding 24 to produce the main field flux 74 which increases the output voltage of the generator. With the transistor 140 conductive, the potential of junction 144 at the lower end of winding 24 is a low value, substantially at the ground potential of conductor 130 because of the low impedance of the conductive collector-emitter of transistor 140. The low impedance collector-emitter circuit effectively forms a shunt path that by-passes or shorts out the reverse field winding 26 so that it is deenergized. Accordingly, the magnetic flux fields of main field winding 24 and permanent magnets 52 and 54 generate voltages in the output winding 22.

The desired regulated output voltage is reached when the voltage across the voltage divider network 160 produces a voltage across the variable resistor 172 that is sufficient to reach the reverse breakdown voltage of Zener didoe 188. When this happens, the base-emitter circuit of transistor 164 is forward biased to become conductive in its collector-emitter circuit and reduce the voltage of conductor 194 to a value where transistors 148 and 140 are biased nonconductive. The shunt path provided by the collector-emitter circuit of transistor 140 now becomes a high impedance and no longer shorts out reverse field winding 24. The main field winding excitation current is substantially reduced since the high resistance of reverse field winding 26 is placed effectively in series with winding 24.

The generator output voltage is applied across both the series field windings 24 and 26. As noted above, in the embodiment disclosed herein the reverse field winding 26 comprises 390 coil turns having a resistance of approximately fifteen ohms and the main field winding 24 comprises 156 coil turns having approximately one ohm. Because the voltage drop across the winding 26 is substantially higher than the voltage drop across the winding 24 and has a larger number of coil turns, the reverse field winding 26 is excited so as to be in a maximum flux producing condition while the main field winding produces negligible magnetic flux. The reverse field flux 76 substantially neutralizes the voltage producing effects of the permanent magnet fluxes 78 and 80 produced by the permanent magnets 52 and 52 as explained hereinabove.

The generator output voltage, which is applied across the voltage divider network 160, accordingly decreases to the desired regulated voltage. The voltage divider output at junction 176 drops below the reverse breakdown voltage of Zener diode 188 so that it is nonconductive. The forward base biasing voltage of transistor 164 is removed and transistor 164 becomes nonconductive. The potential of conductor 194 rises so that the base electrodes of transistors 148 and 140 become forward biased and the transistors are returned to a conductive position. The main field winding 24 is now connected through the collector-emitter circuit of transistor 140 across the generator output voltage and the reverse field winding 26 is deenergized by the effectively short circuit path provided by the transistor 140. All of the output voltage is then substantially across field winding 24 so that the field winding current rises to develop the main field flux 74. Accordingly, only the main field flux 74 and permanent magnet fluxes 78 and 80 are being provided to increase the voltage generated in the output winding 22.

The main and reverse field windings 24 and 26 are alternately excited at a high rate in accordance with the generator output voltage and the operation described above wherein the transistors 140 and 146 alternately conduct to alternately produce main and reverse flux field.

Although one type of permanent magnet generator has been disclosed, it is contemplated that there are other generators using permanent magnets or having a residual magnetic flux produced by a magnetized portion of a generator magnetic circuit. These generators may incorporate a reverse field winding which opposes the voltage producng effects that increase the generator output voltage while the main field is deenergized. Accordingly, the main and reverse field windngs would be energized cyclically by a voltage regulating system comprising the present invention.

While the embodiments of the present invention as herein disclosed constitute a preferred form, it is to be understood that other forms might be adopted.

What is claimed is as folows:

1. A regulating system for an alternating current generator comprising; an alternating current generator havingan output winding, a main field winding, a reverse field winding and a magnetic circuit having a magnetized portion providing a flux to produce a voltage in said output winding, rectifier means having alternating current input terminals connected with said output winding and direct current output terminals, a voltage responsive switching device operative between conducting and nonconducting states, a pair of parallel connected circuits including a first circuit including said voltage responsive switching device and a second circuit including said reverse field winding wherein the resistance of second circuit is substantially higher than the resistance of said main field winding, said pair of parallel circuits connecting said main field winding in series with said output winding, said switching device connecting said main field winding across said output winding and substantially bypassing said reverse field winding when said switching device is biased conductive, and said main and reverse field windings connected in series across said output winding when said switching device is biased nonconductive, a voltage sensing circuit connected with said direct current output terminals of said rectifier means for sensing the output voltage of said generator, said voltage sensing circuit connected to said voltage responsive switching means and operative to bias said voltage responsive switching means to the conducting state when the output voltage of said generator is above a desired regulated value and operative to bias said voltage responsive switching means to the nonconducting state when the output voltage of the said generator is below said desired regulated value, the higher resistance of said second circuit being such that the flux developed by said main field winding is negligible as compared to the flux developed by said reverse field winding to oppose the flux provided by said generator magnetized portion and thereby lower the voltage produced in said output winding when said switching device is biased nonconducting to terminate the bypassing of said reverse field winding.

2. A regulating system for an alternating current generator having an output winding, a main field winding and a reverse field winding, said regulating system comprising; rectifier means having alternating current input terminals connected to said output winding and direct current output terminals, a regulating output transistor operative between conductive and non-conductive states, means connecting said reverse field winding in series with said main field winding and in parallel with the collector-emitter circuit of said output transistor, means connecting the collector-emitter circuit of said output transistor and said main field winding in a series connection and with said output winding, a voltage sensing means connected to said direct current output terminals of said rectifier circuit, means connecting said voltage sensing means to base circuit of said output transistor, said voltage sensing means developing a first voltage which is operative to bias said output transistor conductive when the voltage of said direct current output terminals is below a desired regulated value and developing a second voltage which is operative to bias said output transistor nonconductive when the voltage of said direct current output terminals is above the desired regulated value, the collector-emitter circuit of said output transistor operatively connecting said main field winding with said output winding and substantially short circuiting said reverse field winding to increase the generator output voltage when said output transistor is biased conductive, said reverse field winding operatively connected in series with said main field winding and with said output winding to decrease said generator output voltage when said output transistor is biased nonconductive.

3. A regulating system for an alternating current generator comprising; an alternating current generator including an output winding to produce the generator output voltage, a main field winding, one or more permanent magnets producing magnetic flux in an aiding relationship to magnetic flux produced by said main field winding, and a reverse field winding having a substantially higher resistance value than the resistance value of said main field winding and substantially more coil turns than the coil turns of said main field turns to produce a magnetic flux opposing the flux of said permanent magnets; a power rectifier circuit having direct current output terminals and means connecting said power rectifier circuit with said output winding; means connecting said main field winding and said reverse field winding in series with said direct current output terminals; an auxiliary rectifier circuit connected with said output winding; an output transistor and a turn-off transistor; means connecting the collector-emitter circuit of said output transistor in series with said main field winding and said direct current output terminals and in parallel with said reverse field winding; means connecting said turn-off transistor in series with said main and reverse field windings and said direct current output terminals; means connecting the base circuit of said turn-off transistor with said auxiliary rectifier circuit to bias the turn-off transistor conductive when said generator is operating to produce an output voltage; a voltage sensing means, means connecting said voltage sensing means with said direct current output terminals, and means connecting said voltage sensing means to the base circuit of said output transistor, said voltage sensing means providing a first voltage value to bias said output transistor conductive when the generator otuput is below a desired voltage and providing a second voltage value to bias said input transistor nonconductive when the generator output is above the desired voltage; said main field winding being excited to develop a main field flux when said output transistor is biased conductive to substantially bypass said reverse field winding, the resistance values and number of coil turns of said main and reverse field windings being arranged so that the flux developed by said main field winding is negligible relative to the flux developed by said reverse field winding to oppose said permanent magnet flux when said output transistor is biased nonconductive to terminate the bypassing of said reverse field winding.

References Cited

UNITED STATES PATENTS

| | | | |
|---|---|---|---|
| 3,017,562 | 1/1962 | Duane | 322—46 |
| 3,343,059 | 9/1967 | Kirk et al. | 322—63 X |
| 3,392,294 | 7/1968 | Campbell | 310—263 X |

BENJAMIN DOBECK, Primary Examiner

H. HUBERFELD, Assistant Examiner

U.S. Cl. X.R.

310—188; 322—46, 64, 68, 73